US011481240B2

(12) United States Patent
Shamaiah et al.

(10) Patent No.: US 11,481,240 B2
(45) Date of Patent: Oct. 25, 2022

(54) CAPTURING TRACES OF VIRTUAL MACHINE OBJECTS COMBINED WITH CORRELATED SYSTEM DATA

(71) Applicant: INTERNATIONAL BUSINESS MACHINES CORPORATION, Armonk, NY (US)

(72) Inventors: Srividya Shamaiah, Bangalore (IN); Vijayalakshmi Kannan, Bangalore (IN); Deepthi Sebastian, Bangalore (IN); Gireesh Punathil, Kerala State (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 16/205,515

(22) Filed: Nov. 30, 2018

(65) Prior Publication Data
US 2020/0174812 A1 Jun. 4, 2020

(51) Int. Cl.
*G06F 9/455* (2018.01)
*G06F 9/50* (2006.01)
*G06F 9/54* (2006.01)

(52) U.S. Cl.
CPC ........ *G06F 9/45558* (2013.01); *G06F 9/5077* (2013.01); *G06F 9/541* (2013.01); *G06F 2009/45575* (2013.01)

(58) Field of Classification Search
CPC ............. G06F 11/3466; G06F 11/3636; G06F 11/3664

(Continued)

(56) References Cited

U.S. PATENT DOCUMENTS 5,642,478 A 6/1997 Chen et al.
6,047,390 A 4/2000 Butt et al.
(Continued)

OTHER PUBLICATIONS

Ottogalli, F.G. et al. "Visualisation of Distributed Applications for Performance Debugging". 2001. ICCS 2001, LNCS 2074, pp. 831-840, (Year: 2001).*

(Continued)

*Primary Examiner* — Kenneth Tang
(74) *Attorney, Agent, or Firm* — Monchai Chuaychoo; Andrew D. Wright; Roberts Calderon Safran & Cole, P.C.

(57) ABSTRACT

A computer-implemented method includes opening, by a computer device, a global data dictionary on a virtual machine running on the computer device; running, by the computer device, a system defined class on the virtual machine; allocating, by the computer device, program objects that relate to the system defined class from an operating system onto the virtual machine; initializing, by the computer device, a system trace module on the virtual machine; collecting and storing in the global data dictionary, by the computer device, additional class data that was not originally abstracted, the additional class data being references to the allocated program objects; triggering, by the computer device, the system trace module in response to a trace event; identifying, by the computer device, particular ones of the program objects that relate to the trace event; and consolidating, by the computer device, the additional class data that corresponds to the particular ones of the program objects with abstracted object data that corresponds to the particular ones of the program objects, the additional class data being different from the abstracted object data.

20 Claims, 9 Drawing Sheets

(58) Field of Classification Search
USPC .......................................................... 718/1
See application file for complete search history.

(56) References Cited

U.S. PATENT DOCUMENTS

| | | | |
|---|---|---|---|
| 6,513,155 B1 | 1/2003 | Alexander, III et al. | |
| 6,738,965 B1 | 5/2004 | Webster | |
| 7,058,786 B1 | 6/2006 | Oliveri | |
| 7,200,776 B2 | 4/2007 | Harris | |
| 8,028,200 B2 | 9/2011 | Ivanov et al. | |
| 8,201,187 B2 | 6/2012 | Monnie et al. | |
| 8,935,395 B2 | 1/2015 | Bansal et al. | |
| 10,609,143 B1* | 3/2020 | Nossik | H04L 67/2842 |
| 2004/0060058 A1* | 3/2004 | Liang | G06F 9/45504 |
| | | | 719/331 |
| 2005/0102578 A1 | 5/2005 | Bliss et al. | |
| 2005/0210077 A1 | 9/2005 | Balakrishnan et al. | |
| 2006/0129993 A1* | 6/2006 | Belisario | G06F 11/362 |
| | | | 717/124 |
| 2008/0098364 A1 | 4/2008 | Gray-Donald et al. | |
| 2008/0127110 A1* | 5/2008 | Ivanov | G06F 11/3476 |
| | | | 717/128 |
| 2009/0150908 A1 | 6/2009 | Shankaranarayanan et al. | |
| 2009/0158385 A1* | 6/2009 | Kim | G06F 21/6218 |
| | | | 726/1 |
| 2010/0251219 A1* | 9/2010 | Peacock | G06F 11/3636 |
| | | | 717/128 |
| 2011/0161956 A1* | 6/2011 | Vennam | G06F 11/366 |
| | | | 718/1 |
| 2012/0054472 A1* | 3/2012 | Altman | G06F 11/3476 |
| | | | 712/219 |
| 2012/0159454 A1* | 6/2012 | Barham | G06F 11/3466 |
| | | | 717/128 |
| 2012/0260133 A1* | 10/2012 | Beck | G06F 11/323 |
| | | | 714/38.1 |
| 2013/0152064 A1* | 6/2013 | Gagliardi | G06F 9/44521 |
| | | | 717/166 |
| 2013/0159999 A1* | 6/2013 | Chiueh | G06F 9/45504 |
| | | | 718/1 |
| 2014/0298334 A1* | 10/2014 | Munetoh | G06F 3/0664 |
| | | | 718/1 |
| 2015/0309789 A1* | 10/2015 | Thorat | G06F 11/3466 |
| | | | 717/121 |
| 2016/0078342 A1 | 3/2016 | Tang | |
| 2016/0266998 A1 | 9/2016 | Gautallin et al. | |
| 2017/0060732 A1* | 3/2017 | Golfieri | G06F 11/3664 |
| 2018/0046565 A1* | 2/2018 | Lu | G06F 11/3636 |
| 2020/0089599 A1* | 3/2020 | Hegarty | G06F 9/4552 |

OTHER PUBLICATIONS

Zhang et al. "HBench:Java: An Application-Specific Benchmarking Framework for Java Virtual Machines". Jun. 3-5, 2000. ACM Java Grande 2000 Conference, San Francisco, California. All pages. (Year: 2000).*

Grossman et al. "HadoopCL2: Motivating the Design of a Distributed, Heterogeneous Programming System With Machine-Learning Applications". Mar. 2016. IEEE Transactions on Parallel and Distributed Systems, vol. 27, No. 3. pp. 1 and 6-8 (Year: 2016).*

Mell et al., "The NIST Definition of Cloud Computing", NIST, Special Publication 800-145, Sep. 2011, 7 pages.

Anonymous, "openj9", https://github.com/Param-S/openj9/blob/master/runtime/rastrace/trcengine.c, Dec. 22, 2017, 29 pages.

Anonymous, "Java Platform, Standard Edition Java Flight Recorder Runtime Guide", https://docs.oracle.com/javacomponents/jmc-5-4/jfr-runtime-guide/about.htm#JFRUH170, accessed May 24, 2021, 4 pages.

Anonymous, "Registering for trace", https://www.ibm.com/docs/en/sdk-java-technology/8?topic=trace-registering, accessed May 24, 2021, 2 pages.

Anonymous, "Example HelloWorld with application trace", https://www.ibm.com/docs/en/sdk-java-technology/8?topic=trace-example-helloworld-application, accessed May 24, 2021, 3 pages.

* cited by examiner

CAPTURING TRACES OF VIRTUAL MACHINE OBJECTS COMBINED WITH CORRELATED SYSTEM DATA

BACKGROUND

The present invention relates generally to virtual machines and, more particularly, to determining and diagnosing problems in virtual machines.

Virtual machines operate at a higher level of abstraction above the operating system and the hardware. The abstraction helps to improve the ease of programming at the application layer because isolating the system internals from business logic drastically improves the developer productivity as well as code portability and maintainability.

SUMMARY

In a first aspect of the invention, there is a computer-implemented method including: opening, by a computer device, a global data dictionary on a virtual machine running on the computer device; running, by the computer device, a system defined class on the virtual machine; allocating, by the computer device, program objects that relate to the system defined class from an operating system onto the virtual machine; initializing, by the computer device, a system trace module on the virtual machine; collecting and storing in the global data dictionary, by the computer device, additional class data that was not originally abstracted, the additional class data being references to the allocated program objects; triggering, by the computer device, the system trace module in response to a trace event; identifying, by the computer device, particular ones of the program objects that relate to the trace event; and consolidating, by the computer device, the additional class data that corresponds to the particular ones of the program objects with abstracted object data that corresponds to the particular ones of the program objects, the additional class data being different from the abstracted object data.

In another aspect of the invention, there is a computer program product including a computer readable storage medium having program instructions embodied therewith. The program instructions are executable by a computing device to cause the computing device to open a global data dictionary on a virtual machine running on the computing device; run a system defined class on the virtual machine; allocate program objects that relate to the system defined class from an operating system onto the virtual machine; initialize a system trace module on the virtual machine; collect and store in the global data dictionary additional class data that was not originally abstracted, the additional class data being references to the allocated program objects; trigger the system trace module in response to a trace event; identify particular ones of the program objects that relate to the trace event; and consolidate the additional class data that corresponds to the particular ones of the program objects with abstracted object data that corresponds to the particular ones of the program objects, the additional class data being different from the abstracted object data.

In another aspect of the invention, there is system including a processor, a computer readable memory, and a computer readable storage medium. The system includes program instructions to open a global data dictionary on a virtual machine, program instructions to run a system defined class on the virtual machine, program instructions to allocate program objects that relate to the system defined class from an operating system onto the virtual machine, program instructions to initialize a system trace module on the virtual machine, program instructions to collect and store in the global data dictionary additional class data that was not originally abstracted, the additional class data being references to the allocated program objects, program instructions to trigger the system trace module in response to a trace event, program instructions to identify particular ones of the program objects that relate to the trace event, and program instructions to consolidate the additional class data that corresponds to the particular ones of the program objects with abstracted object data that corresponds to the particular ones of the program objects, the additional class data being different from the abstracted object data. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
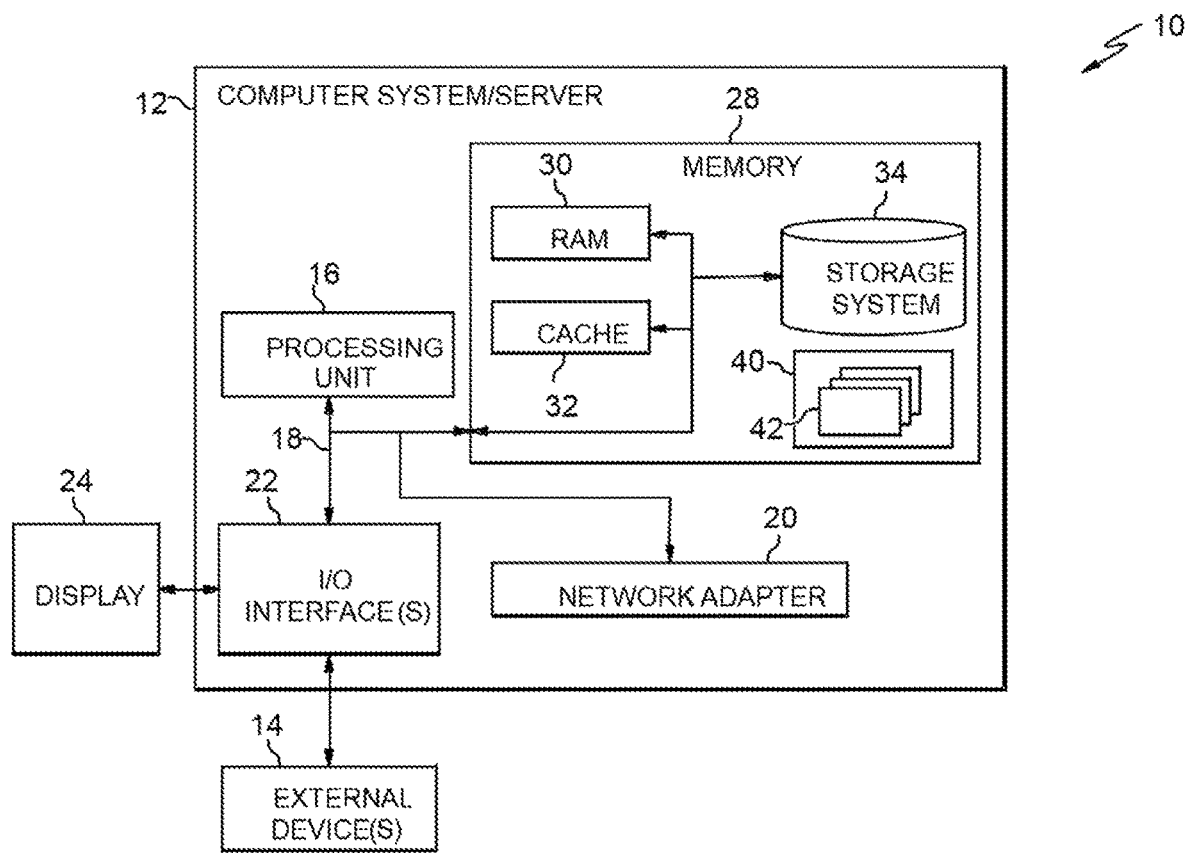
FIG. 1 depicts a cloud computing node according to an embodiment of the present invention.

The present invention relates generally to virtual machines and, more particularly, to determining and diagnosing problems in virtual machines. According to aspects of the invention, systems and methods trace, record, and integrate important data structures in the underlying system that are in use by a specific application running under a virtual machine, and thereby aid troubleshooting. In embodiments, the important data structures are consolidated with corresponding abstracted object data and stored in a global data dictionary for use in diagnosing a problem with the application. In this manner, implementations of the invention advantageously improve the ability of a diagnostic technician to diagnose a problem with the application in a more efficient manner.

Implementations of the invention improve the performance of a computer system by defining important native back-end abstractions in a virtual machine and collecting low level information that is then integrated with the virtualized abstractions. The integrated result is used to make diagnosing problems more efficient by making the data necessary for diagnostics more easily and quickly available.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
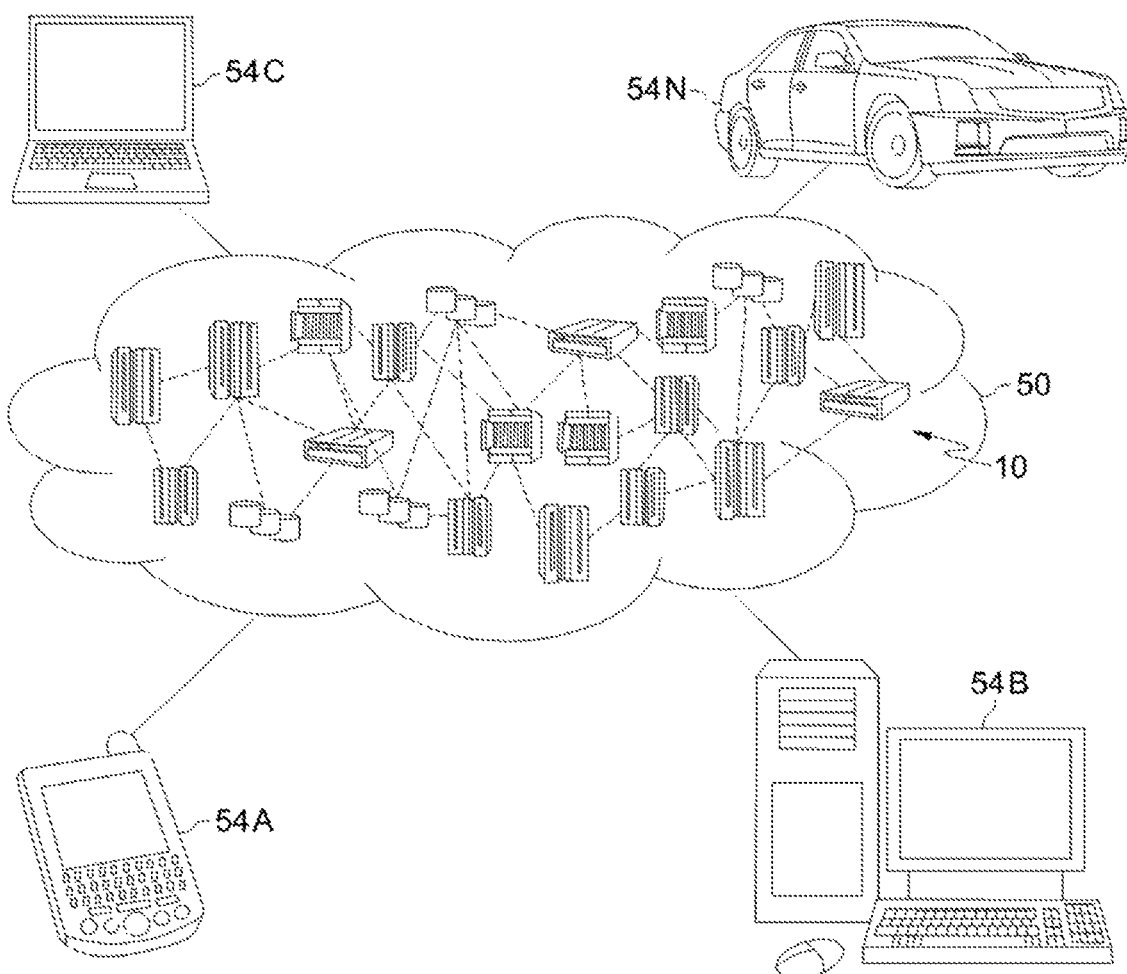
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
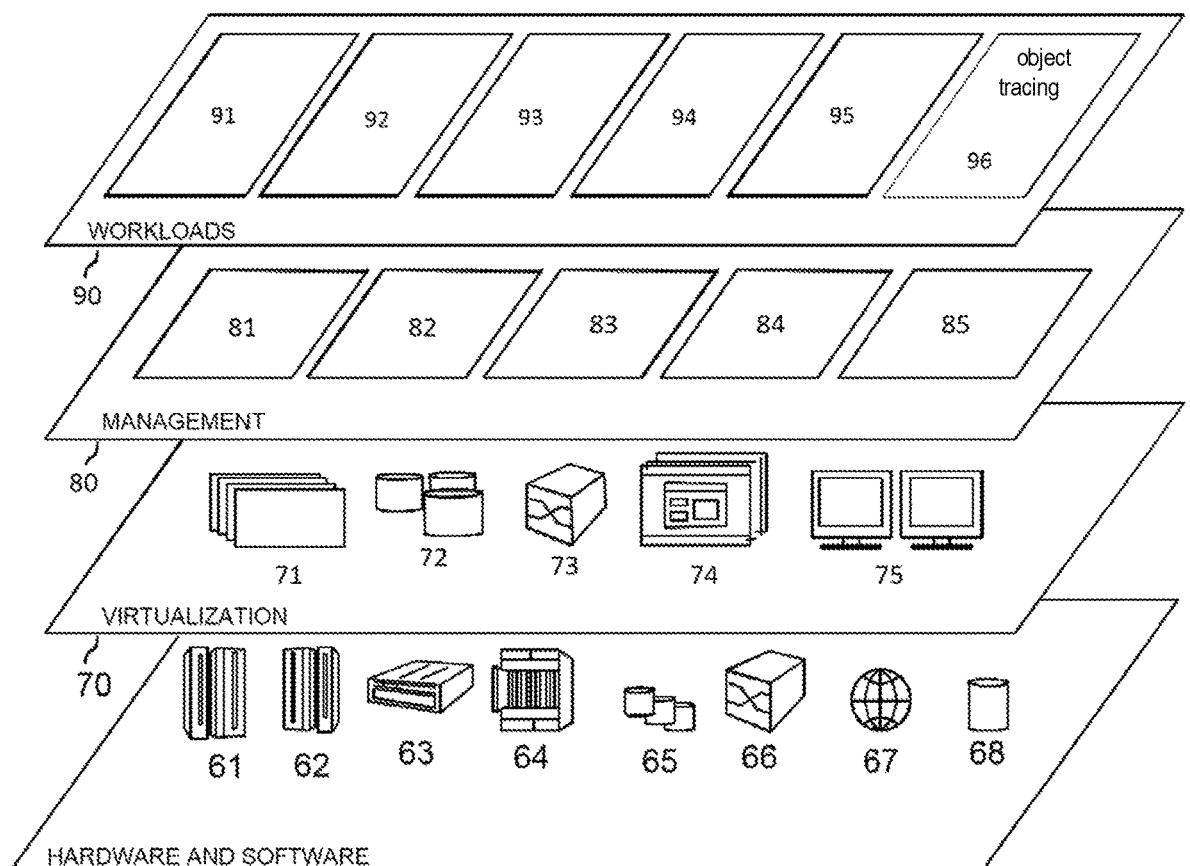
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object tracing 96.

Implementations of the invention may include a computer system/server 12 of FIG. 1 in which one or more of the program modules 42 are configured to perform (or cause the computer system/server 12 to perform) one or more functions of the object tracing 96 of FIG. 3. For example, the one or more of the program modules 42 may be configured to: open a global data dictionary on a virtual machine running on the computing device; run a system defined class on the virtual machine; allocate program objects that relate to the system defined class from an operating system onto the virtual machine; initialize a system trace module on the virtual machine; collect and store class data in the global data dictionary, the class data being references to the allocated program objects; trigger the system trace module in response to a trace event; identify particular ones of the program objects that relate to the trace event; and consolidate the class data that correspond to the particular ones of the program objects with abstracted object data that correspond to the particular ones of the program objects, the class data being different from the abstracted object data.

As stated above, virtual machines operate at a higher level of abstraction above the operating system and the hardware. The abstraction helps to improve the ease of programming at the application layer because isolating the system internals from business logic drastically improves the developer productivity as well as code portability and maintainability.

Much of the modern workload is hosted either in virtual machines or managed runtimes. While the term virtual machine has a wider definition in that it virtualizes a real machine, an operating system, or a user program, all usage of virtual machine presented in this disclosure refer to the process virtual machine, which executes computer programs in a platform independent manner. For any further disambiguation, refer to Java Virtual Machine or Node.js virtual machine as examples. While much of the description below is presented with regard to a virtual machine, it is noted that the same principles also apply to managed runtimes. Virtualization inherently adds complexity and effort for problem determination of production anomalies. Tools have been developed to extract system level information when program anomalies occur, but there are gaps, and the current way of mitigation is to resort to custom debug modules to capture contextual information. This disclosure provides a comprehensive way of capturing the most contextual and vital information from a virtual machine without incurring any performance degradation to the application.

Having an enhanced language runtime that is capable of capturing deep insights from the operating system which are abstracted by the runtime provides unprecedented serviceability capability to the hosted application, including cloud applications.

Problem determination and diagnostics can be more challenging in a virtual environment. As there is an abstraction layer between the underlying system (where the problem originated) and the application code logic (where the problem is manifested), often the debugging requires de-abstracting the manifested problem into the underlying system layer, and then applying diagnostics at that area to figure out the root cause. To illustrate this with an example, a network endpoint (socket) is often abstracted into a class socket in virtual machines. The class encapsulates the low-level descriptor, and provides wrappers around the most commonly used system calls in the form of application programming interfaces (APIs), for example read, write, close etc. When an anomaly occurs around this abstraction (such as a connectivity failure), the debugging process may require visibility into all socket attributes rather than only what is cached/abstracted in the object. While native tools (such as IP traces etc.) provide comprehensive low-level information, they lose bearing with the application since data capture is performed outside of the application's scope and through direct system-supplied methods.

Examples of common system abstractions based on the most common diagnostic challenges are: thread, file, socket, mutex, shared memory, pipes, semaphore, process, events etc. Embodiments of the invention include systems and methods to define the most important native back-end abstractions in a virtual machine or managed runtime and to collect low-level information and integrate that information with the virtualized artifacts for improving the diagnostic experience.

Embodiments of the invention include systems and methods to trace, record, and integrate the vital data structures in the underlying system that are in use by a specific application running under a virtual machine and, thereby, aid troubleshooting. The exemplary embodiment of the invention shown in FIG. 4 includes a modified virtual machine 200 (such as, for example, a Java virtual machine, a Python virtual machine, a language execution environment, a language runtime environment, or a Java runtime environment) which has a global data dictionary 260 to store information regarding the important data structures of the underlying system that have implications in the virtual machine 200. The global data dictionary 260 is built over time as an application 210 progresses and based on the usage of code modules that make use of objects which contain native back end data. In embodiments, the virtual machine 200 has all the native back end system/class data 230 that encapsulate the native artifacts from native resources 310 that are needed to implement the application 210. The native resources are drawn from an operating system 300 running on a computing device 320. In this embodiment, the virtual machine 200 runs on a computer device 100, which may comprise the computer system/server 12 of FIG. 1. In some embodiments, the virtual machine 200 and the operating system 300 reside on one computer device 100'.

In embodiments, the modified virtual machine 200 has a system trace module 220 initialized along with the virtual machine 200 and running in the background, along with the application 210. Embodiments include a pre-determined trace destination, either in the form of a trace log 250 or in the form of an outbound port. In embodiments, the modified virtual machine 200 defines a trace event that triggers a trace action. The trace event can be, for example, any of: a user signal, virtual machine startup/shutdown, a particular method being entered or exited, a specific exception being thrown, a predefined component trace point being hit, etc. In embodiments, for the same purpose as a trigger of a trace event, the virtual machine 200 defines an application programming interface (API) that other parts of the application 210 can invoke programmatically.

Various embodiments include methods having one or more of the following steps: (1) loading a system defined class that implements an API such as, for example, 'traceSystemObjects' when the virtual machine is initialized; (2) initializing a signal handler that gets invoked when the virtual machine process is intercepted with a pre-defined signal such as a user defined signal; or (3) pre-define trace trigger points at vital control flow points in the application execution, for example any of: user signal, virtual machine startup/shutdown, a particular method being entered or exited, a specific exception is thrown, a predefined component trace point being hit, etc. The action of initiating the trace is performed in all three of the above cases.

Figure 4:
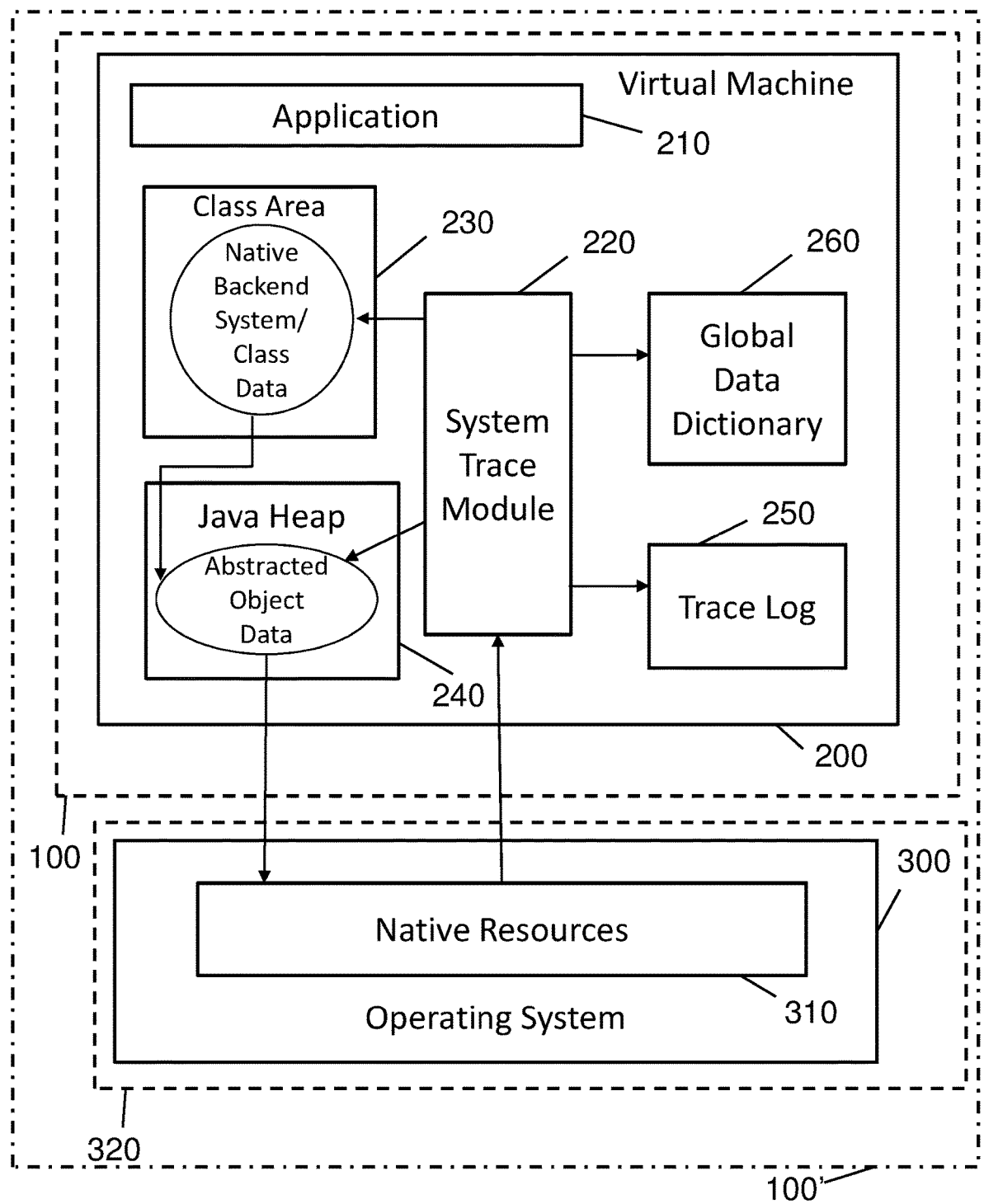
FIG. 4 shows a block diagram of an exemplary environment in accordance with aspects of the invention.

In some embodiments, a well-known port where the trace data will be written into is opened when the virtual machine 200 is initialized. In other embodiments, a disk file with a well-known filename such as 'systemtrace.txt' is opened. In these two cases, the data contained by the socket buffer pointed by the port or the disk block pointed by the filename is one and the same. In FIG. 4, the trace log 250 represents whichever of the port or the file is being used.

In some embodiments, the code module for the trace module 220 is initialized when the virtual machine 200 is initialized. The trace module 220 works in conjunction with the object allocation/de-allocation system in the virtual machine 200, such as a garbage collector (in those virtual machines which implement a garbage collector). Embodiments of the invention cover classes that are implemented by the virtual machine 200. If third party library modules or application code modules abstract the native back ends, special protocols are implemented between those classes in the trace module 220. In embodiments, the trace module 220 runs, for example, in a separate thread in virtual machines that support multiple threads. In embodiments run on single-threaded virtual machines, the trace module 220 runs in the main application thread.

In embodiments, when the abstracted object data is allocated in the virtual machine's object heap (represented by Java heap 240 in FIG. 4), a reference of such object is cached into the global data dictionary 260. In embodiments that implement garbage collection, when the virtual machine 200 undergoes garbage collection the entries in the global data dictionary 260 are adjusted to remove those objects that got collected as garbage.

In embodiments, when the application executes and either intercepts a user defined signal, invokes the predefined API, or encounters a predefined trace event, the signal handler or the predefined API passes control over to the trace module 220. The trace module 220 enumerates the relevant objects present in the global data dictionary 260 and for each object, it invokes the 'trace' method, and collects the output as returned by the method. The trace method is responsible for collecting the data elements from the system that are currently not covered under the abstracted object, in a custom manner private to each object. For each data output thus collected, the trace module 220 tags the data record with the object that is responsible for it, and then writes the trace data into the port or the file (trace log 250). In embodiments, once all the objects are iterated, the trace module also writes the current timestamp into the trace destination (trace log 250) to delimit the trace history. The control is then passed back to the API, the signal handler, or the trace event that invoked the trace module 220. These steps are repeated each time a trace signal is received, the API is called, or the trace event is hit.

In embodiments, the trace module 220 is shut down when the virtual machine 200 is terminated. At this time the global data dictionary 260 is purged and the trace port/file is closed. In some embodiments where the trace module 220 is implemented as a separate thread, it is shut down by terminating that thread in virtual machine 200.

In another embodiment of the invention, the virtual machine 200 includes a trace filter that defines one or more objects which require tracing. These are defined by either their identifiers directly, by their class names, or by a regular expression that matches the object or their class names. The trace module 220 receives the filter definition from the trace filter and applies the filter to the global data dictionary 260.

The end result of this filtration is that only those objects which match the filter condition will be enumerated and traced.

In another embodiment of the present invention, the trace filter is processed and applied at the time of object construction itself, instead of at the tracing site. The end result of this is that only those objects which pass the filter criteria get recorded in the global data dictionary 260. As only the necessary objects are stored in the global data dictionary, this optimizes the performance as well as memory foot print while providing customization on the user experience. When such an optimization is applied, when an attempt is made to request a trace via the trace API for an object that does not meet the filter criteria, the request will not be honored.

Figure 5:
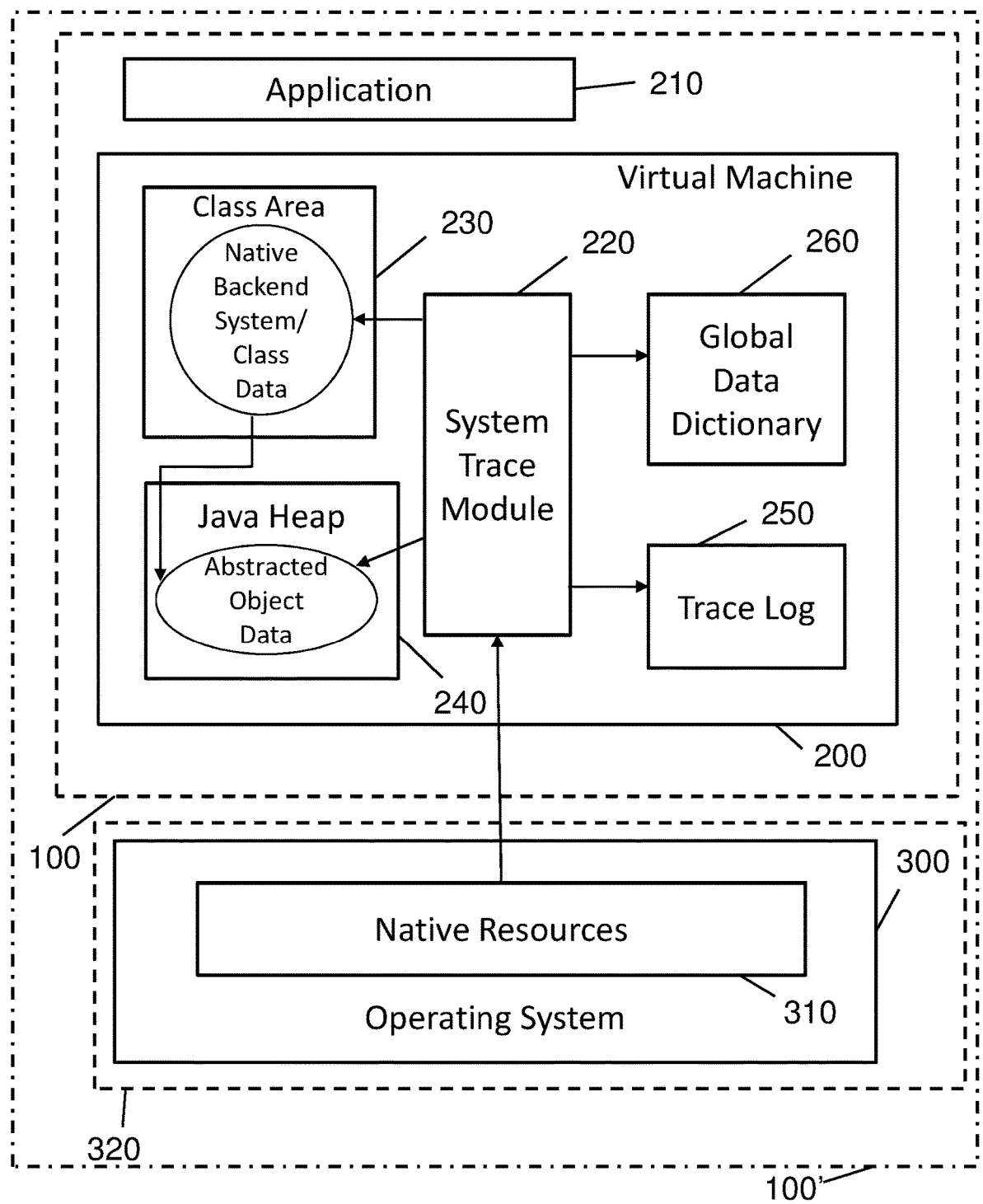
FIG. 5 shows a block diagram of an exemplary environment in accordance with aspects of the invention.
Figure 6:
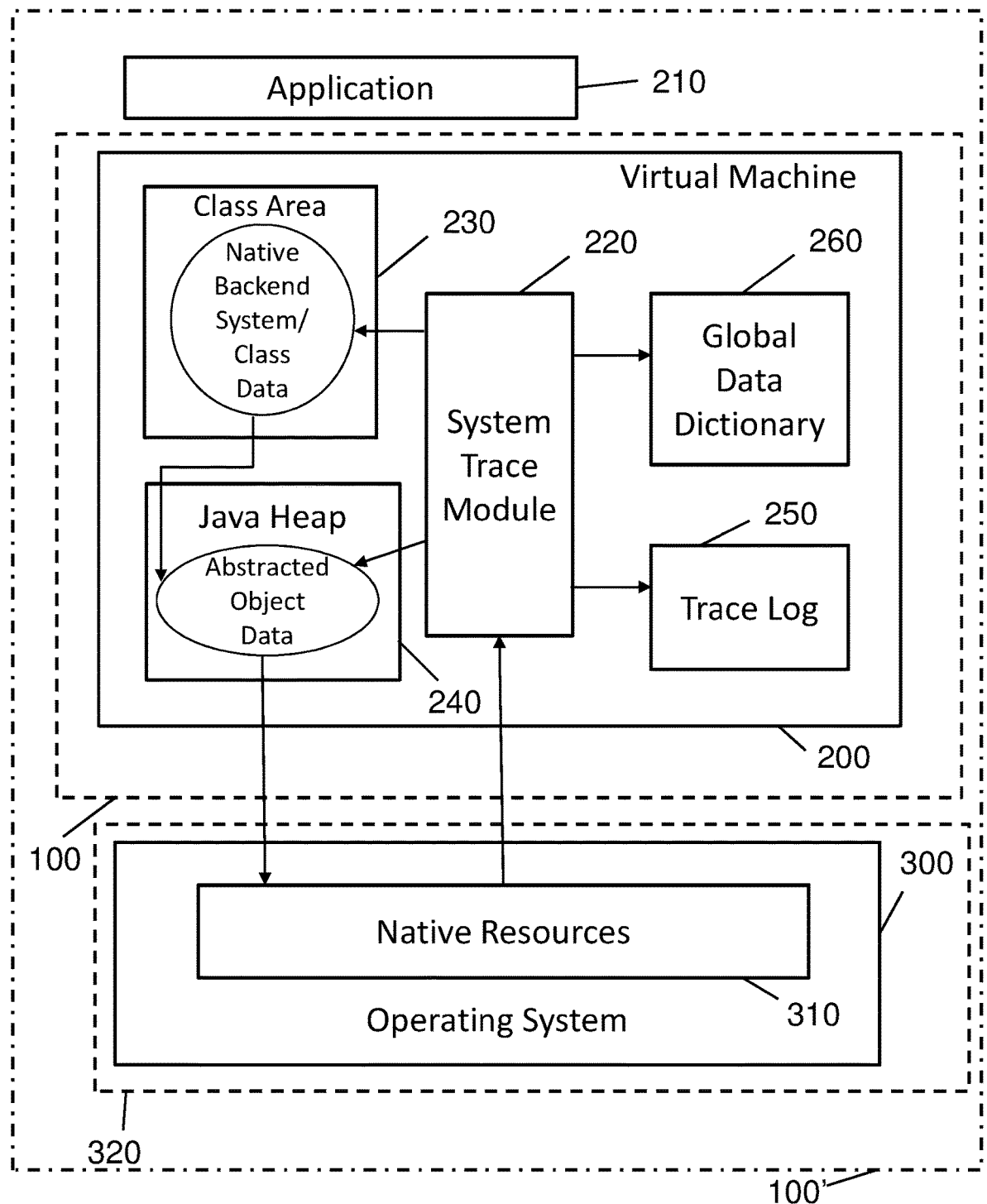
FIG. 6 shows a block diagram of an exemplary environment in accordance with aspects of the invention.

While the application 210 in the embodiment shown in FIG. 4 runs on the virtual machine 200, an embodiment in which the application runs outside of the virtual machine 200 but still on the computer device 100 is shown in FIG. 5. FIG. 6 shows an embodiment in which the application 210 is run on a device other than the computer device 100. In various embodiments, such as some cloud-based systems, it is advantageous for the application 210 to run remotely from the virtual machine 200. An example of such an embodiment (with reference to FIG. 2) is the application 210 running in an automobile 54N while the virtual machine 200 is a cloud computing node 10. While all of the embodiments shown in FIGS. 4-6 show the virtual machine 200 located on the computer device 100 and the operating system 310 located on the computer device 320, it is noted that in some embodiments both the virtual machine 200 and the operating system 310 are located on the same computer device.

As can be seen in the following three examples, the trace module 220 generates integrated trace data (also referred to as consolidated data) that includes both the abstracted data and the native backend system/class data. Embodiments of the invention produce the integrated trace data so that more information (the integrated trace data) is available, for example, for diagnosing a problem by supplementing the public abstract data with the native backend data that is applicable to the problem.

The following is an illustrative example in the Java environment of how embodiments of the invention integrate abstracted data and native backend system/class data to produce integrated trace data.

```
public abstract class SocketImpl implements SocketOptions
{
protected FileDescriptor fd;
protected InetAddress addr;
protected int port;
}
native backend data
{
int linger;
int keepalive;
int recvbuf;
int sendbuf;
int nodelay;
int timeout;
}
integrated trace data example - Java
{ ServerSocket@0x7fff18bc: fd: 16, addr: 127.0.0.1, port: 8080,
linger: false, keepalive: true, recvbuf: 65536, sendbuf: 65536, nodelay:
false, timeout: 15}
```

The following is an illustrative example in an open-source, cross platform JavaScript runtime environment (such as a Node.js environment) of how embodiments of the invention integrate abstracted data and native backend (system) data to produce integrated trace data.

```
abstract data
process {
title: 'node',
version: 'v6.10.2',
arch: 'x64',
platform: 'linux',
env: { ...}
pid: 15083,
argv0: 'node' }
native backend data
{
int attributes;
int *fds;
int limits;
int cpu;
int nice;
int realtime;
char **libs;
}
integrated trace data example - Node.js
{ process@0x7fff01bc: title: 'node', version: 'v6.10.2', arch: 'x64', platform:
'linux', pid: 15083, argv0: 'node', attributes: 0x7, fds: [0, 1, 2, 3, 255], limits: [ l:
64, m: unlimited, n: 1024, p: 8, q: 819200, r: 0, s: 10240, t: unlimited, u: 1024, v:
unlimited, x: unlimited], cpu: 15, nice: 10, realtime: 01:32, libs: ['linux-
vdso.so.1', 'libpthread.so.0',` libc.so.6']}
```

The following is an illustrative example in an integrated high-level programming language (such as, for example, Python) of how embodiments of the invention integrated abstract data and native backend (system) data to produce integrated trace data.

```
abstract data
object file {
closed;
mode;
name;
softspace;
}
native backend data
{
int fd;
int node;
int mode;
time *time;
int size;
int nlinks;
}
integrated trace data example - Python
{ file@0x7fff01d0: closed: false, mode: 'wb', name: 'foo.txt', softspace:
0, fd: 18, node: 4195119, mode: 4294959758, time: [140737488348,
140737488340, 140737488340], size: 194, nlinks: 0}
```

Figure 7:
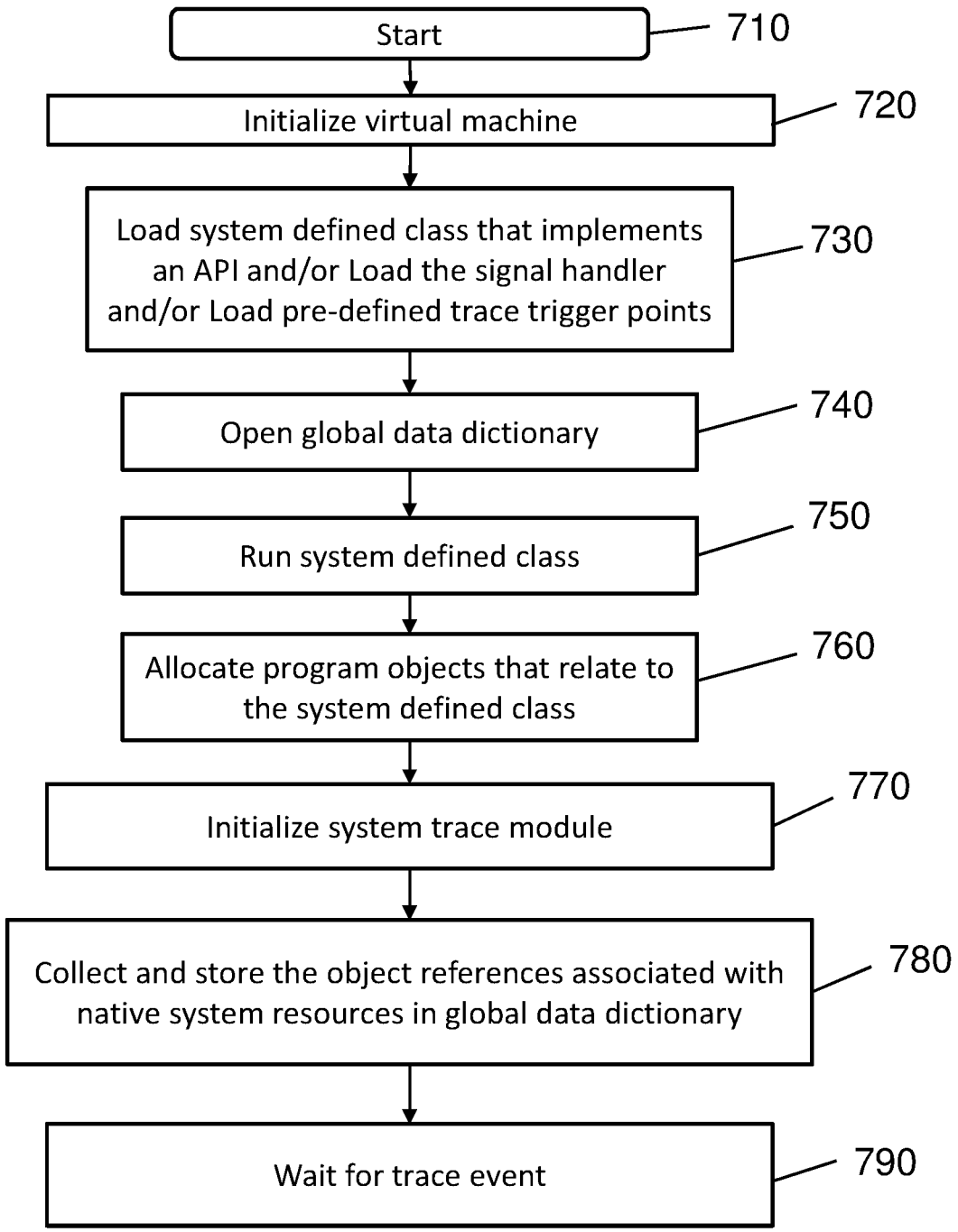
FIG. 7 shows a flowchart of an exemplary method in accordance with aspects of the invention.

FIG. 7 shows a flowchart of an exemplary method of initializing a trace module in accordance with aspects of the present invention. Steps of the method may be carried out in the environment of FIGS. 4-6 and are described with reference to elements depicted in FIGS. 4-6.

At step 710, the system starts. At step 720, the virtual machine 200 is initialized. In step 730, one or more of three elements (an API, a signal handler, and pre-defined trace trigger points) of the trace module 220 are loaded to indicate to the trace module 220 when a triggering event occurs. In step 740, the global data dictionary 260 is opened. In step 750, a system defined class (for example, the application 210) is run. In step 760, program objects that relate to the system defined class are allocated to, for example, Java heap 240. In step 770, the trace module 220 is initialized. In step 780, object references associated with native system resources 310 are collected and stored in the global data dictionary 260. In step 790, the system waits for a trace event.

Figure 8:
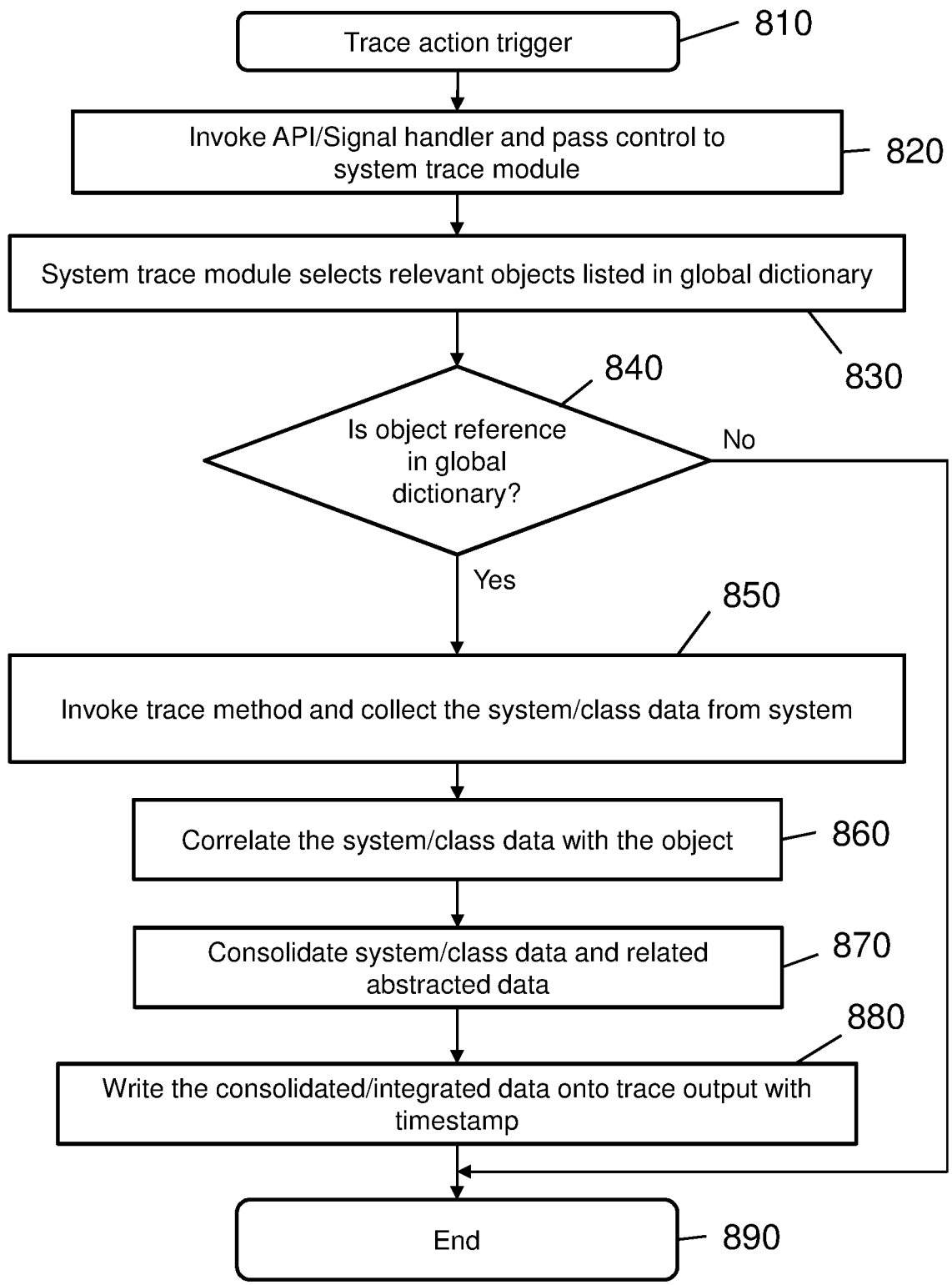
FIG. 8 shows a flowchart of an exemplary method in accordance with aspects of the invention.

FIG. 8 shows a flowchart of an exemplary method of tracing using the trace module in accordance with aspects of the present invention. Processing continues from FIG. 7 to FIG. 8 when a trace action is triggered in step 810. In step 820 the element of the trace module 220 that is loaded in step 730 is invoked and control is passed to the trace module 220. In step 830, the trace module 220 selects the objects listed in the global data dictionary 260 that are associated with the problem that resulted in triggering of the trace action. In step 840, the existence or absence in the global data dictionary 260 of each of the objects selected in step 830 is determined. For any of the objects selected in step 830 that exist in the global data dictionary 260, processing continues to step 850. For any of the objects selected in step 830 that do not exist in the global data dictionary 260, processing continues to step 890 and ends. In step 850, the trace method is invoked and the class/system data 230 is collected from the operating system 300. In this manner, additional class data 230 that was not originally abstracted is collected and stored in the global data dictionary 260. In step 860, the class/system data 230 is correlated with the relevant object from step 830. In step 870, the class/system data 230 and the related abstract data 240 are consolidated. In step 880, the integrated data is written onto the trace log 250 with a timestamp. In step 890, processing ends.

Figure 9:
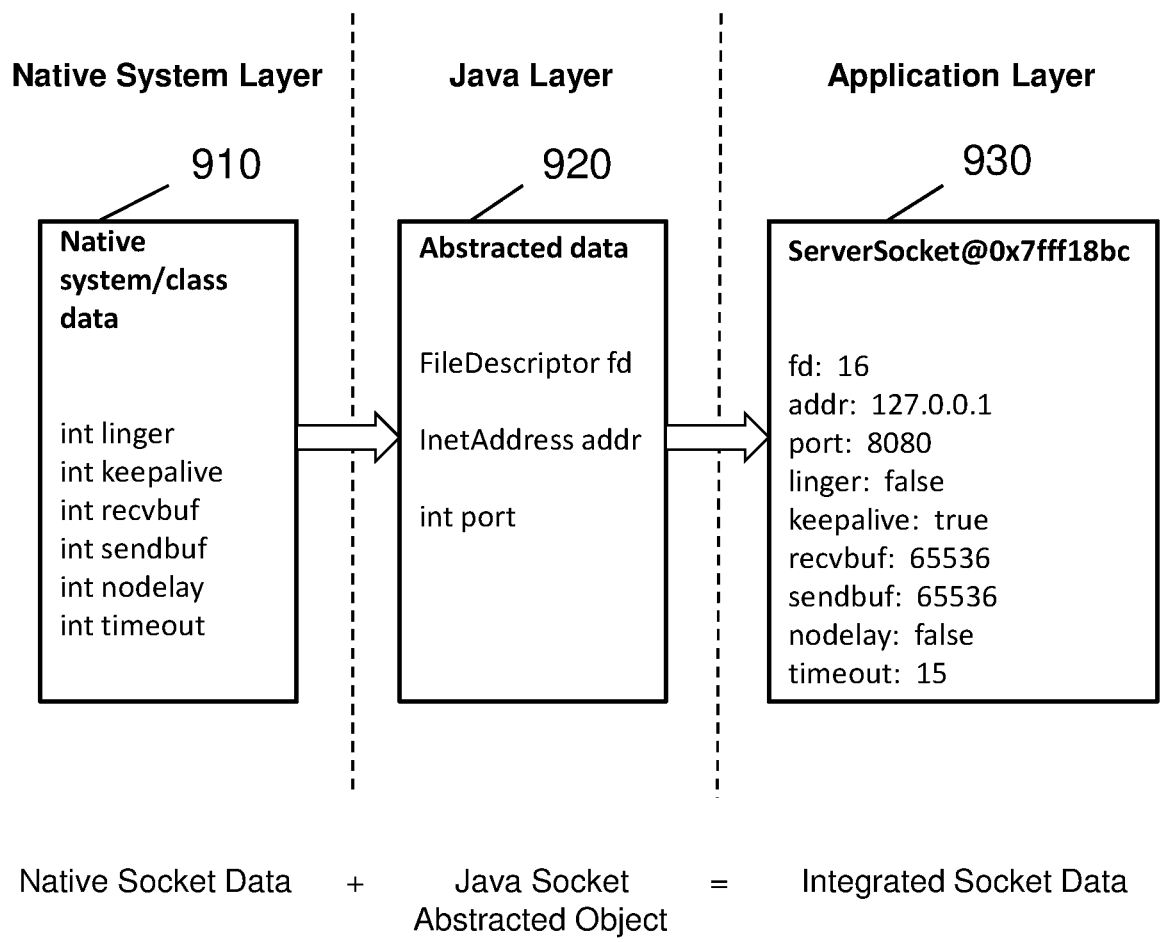
FIG. 9 shows a block diagram of an exemplary environment in accordance with aspects of the invention.

FIG. 9 shows the above Java environment example where system/class data 910 in the native system layer (operating system) is combined with abstracted object data 920 in the Java layer to form integrated data 930 in the application layer. In embodiments, the abstracted object data includes socket options such as, for example, a file descriptor, an internet protocol address and a port identifier.

Embodiments of the invention include systems and methods to record and integrate vital data structures in the underlying system that are currently in use by a production scale application. In embodiments, the application is hosted in a virtual machine and or managed runtime. In embodiments, the vital data structures are extracted partly from the application objects and partly from the underlying system. In embodiments, the vital data structures are integrated with the abstract data that is available in the object memory. In embodiments, the objects are identified by intercepting and recording them at the time of their allocation. In embodiments, the objects are qualified based on what data they abstract from the underlying system. In embodiments, the abstract data is collected from the object memory itself, and the system data is collected by invoking a predefined method on the object that is responsible for extracting the backend data pertinent to the abstract object. In embodiments, the integrated data is written into a well-known port or a well-known file by the trace module. In embodiments, the trace action is triggered through either interrupting the virtual machine process through a predefined user signal, or through invoking a pre-defined API or through a set of pre-defined trace points exposed by the virtual machine.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    running, by a computer device, an application on a virtual machine on a Java layer of the computer device;
    allocating, by the computer device, program objects that relate to the application from an operating system on a native system layer onto the virtual machine on the Java layer, thereby generating allocated program objects on the virtual machine that relate to the application;
    building, by the computer device, a global data dictionary of the virtual machine during the running of the application, wherein the global data dictionary of the virtual machine stores class data in the form of references of the respective allocated program objects;
    initializing, by the computer device, a system trace module on the virtual machine;
    triggering, by the computer device, the system trace module to access the global data dictionary of the virtual machine in response to a trace event, the trace event indicating a problem;
    identifying, by the computer device, particular ones of the allocated program objects in the global data dictionary of the virtual machine that relate to the problem of the trace event;
    in response to the identifying the particular ones of the allocated objects in the global data dictionary of the virtual machine that relate to the problem of the trace event, collecting and storing in the global data dictionary of the virtual machine, by the computer device utilizing the system trace module of the virtual machine, additional native backend class data from the operating system on the native system layer that was not originally abstracted, the additional native backend class data from the operating system being references to the allocated program objects on the virtual machine that relate to the application; and
    consolidating, by the computer device in an application layer, the additional native backend class data from the operating system with abstracted object data that corresponds to the particular ones of the program objects that relate to the problem of the trace event thereby producing integrated trace data in a trace log of the virtual machine with a timestamp, the additional native backend class data from the operating system being different from the abstracted object data.

2. The method of claim 1, further comprising:
    initializing, by the computer device, the virtual machine; and
    purging, by the computer device, the global data dictionary of the virtual machine, upon termination of the virtual machine.

3. The method of claim 2, further comprising loading, by the computer device, the application into the virtual machine.

4. The method of claim 1, wherein the triggering is in response to a request from an application programing interface.

5. The method of claim 1, wherein the system trace module is a signal handler that is invoked when the application is intercepted with a pre-defined signal.

6. The method of claim 1, wherein the operating system resides on a device other than the computer device.

7. The method of claim 1, wherein the operating system resides on the computer device.

8. The method of claim 1, wherein the abstracted object data includes socket options.

9. The method of claim 8, wherein the socket options include a file descriptor, an internet protocol address and a port identifier.

10. The method of claim 1, wherein the trace event is selected from the group consisting of a user signal, startup of the virtual machine, shutdown of the virtual machine, a particular routine being entered, a particular routine being exited, a specific exception being thrown, and a predefined trace point being hit.

11. The method of claim 1, wherein a service provider at least one of creates, maintains, deploys and supports the computer device.

12. The method of claim 1, wherein the running of the application on the virtual machine is provided by a service provider on a subscription, advertising, and/or fee basis.

13. The method of claim 1, wherein the computer device includes software provided as a service in a cloud environment.

14. A computer program product, the computer program product comprising a computer readable storage medium having program instructions embodied therewith, the program instructions executable by a computing device to cause the computing device to:
   run a system-defined class on a virtual machine on a Java layer of the computing device;
   allocate program objects that relate to the system-defined class from an operating system on a native system layer onto the virtual machine on the Java layer, thereby generating allocated program objects that relate to the system-defined class;
   build a global data dictionary of the virtual machine during the running of the application, wherein the global data dictionary of the virtual machine stores class data in the form of references of the respective allocated program objects;
   initialize a system trace module on the virtual machine;
   trigger the system trace module to access the global data dictionary of the virtual machine in response to a trace event, the trace event indicating a problem;
   identify particular ones of the allocated program objects in the global data dictionary of the virtual machine that relate to the problem of the trace event;
   in response to the identifying the particular ones of the allocated objects in the global data dictionary of the virtual machine that relate to the problem of the trace event, collecting and storing in the global data dictionary of the virtual machine, by the system trace module of the virtual machine, additional native backend class data from the operating system on the native system layer that was not originally abstracted, the additional native backend class data from the operating system being references to the allocated program objects that relate to the application; and
   consolidate, in the application layer, the additional native backend class data from the operating system with abstracted object data that corresponds to the particular ones of the program objects that relate to the problem of the trace event, the additional native backend class data from the operating system being different from the abstracted object data, thereby producing integrated trace data in a trace log of the virtual machine with a timestamp.

15. The computer program product of claim 14, wherein the program instructions cause the computing device to initialize the virtual machine; and wherein the allocating the program objects comprises allocating program objects in an object heap of the virtual machine.

16. The computer program product of claim 15, wherein the program instructions cause the computing device to load, into the virtual machine, the system-defined class.

17. A system comprising:
   a processor, a computer readable memory, and a computer readable storage medium;
   program instructions to run a system-defined class on a virtual machine running on a Java layer of a computing device;
   program instructions to allocate program objects that relate to the system-defined class from an operating system on a native system layer onto the virtual machine on the Java layer, thereby generating allocated program objects on the virtual machine that relate to the system-defined class;
   program instructions to build a global data dictionary of the virtual machine during the running of the application, wherein the global data dictionary of the virtual machine stores class data in the form of references of the respective allocated program objects;
   program instructions to initialize a system trace module on the virtual machine;
   program instructions to trigger the system trace module to access the global data dictionary of the virtual machine in response to a trace event, the trace event indicating a problem;
   program instructions to identify particular ones of the allocated program objects in the global data dictionary of the virtual machine that relate to the problem of the trace event;
   program instructions to collect and store in the global data dictionary of the virtual machine, by the system trace module of the virtual machine, additional native backend class data from the operating system on the native system layer that was not originally abstracted in response to the identifying the particular ones of the allocated objects in the global data dictionary of the virtual machine that relate to the problem of the trace event, the additional native backend class data from the operating system being references to the allocated program objects that relate to the application; and
   program instructions to consolidate, in the application layer, the additional native backend class data from the operating system with abstracted object data that corresponds to the particular ones of the program objects that relate to the problem of the trace event, thereby producing integrated trace data in a trace log of the virtual machine with a timestamp, the additional native backend class data from the operating system being different from the abstracted object data,
   wherein the program instructions are stored on the computer readable storage medium for execution by the processor via the computer readable memory.

18. The system of claim 17, wherein the abstracted object data includes socket options, and wherein the socket options include a file descriptor, an internet protocol address, and a port identifier.

19. The system of claim 17, further comprising program instructions to initialize the virtual machine.

20. The system of claim 19, further comprising:
   program instructions to load, into the virtual machine, the system-defined class; and
   program instructions to purge the global data dictionary of the virtual machine, upon termination of the virtual machine.

* * * * *